Feb. 16, 1926.

J. H. ROSS, JR 1,573,749

DENTAL APPLIANCE

Filed Feb. 11, 1921

Inventor:
James H. Ross Jr.

Witness:

Patented Feb. 16, 1926.

1,573,749

UNITED STATES PATENT OFFICE.

JAMES H. ROSS, JR., OF CHICAGO, ILLINOIS, ASSIGNOR OF ONE-HALF TO WILLIAM A. RIBBECK, OF CHICAGO, ILLINOIS.

DENTAL APPLIANCE.

Application filed February 11, 1921. Serial No. 444,137.

*To all whom it may concern:*

Be it known that I, JAMES H. ROSS, Jr., a citizen of the United States, residing at Chicago, in the county of Cook and State of Illinois, have invented a certain new and useful Improvement in Dental Appliances, of which the following is a full, clear, concise, and exact description, reference being had to the accompanying drawings, forming a part of this specification.

My invention relates to dental appliances, and particularly to a dental appliance usable as a tooth brush.

One of the objects of the invention is to provide a simple and practical device of the kind specified.

Another object of the invention is to provide a device which will effectively cleanse and wash the teeth and mouth.

Figure 1:
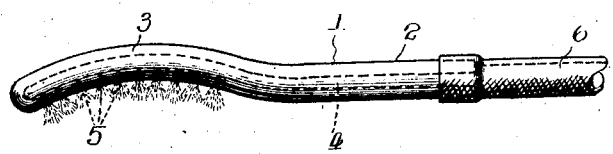
Figure 2:
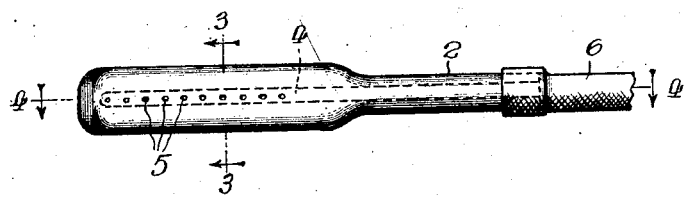

In the accompanying drawings Fig. 1 is a side elevation of a device embodying my present invention;

Fig. 2 is a plan view of the same; and

Figure 3:
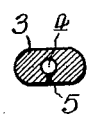
Figure 4:
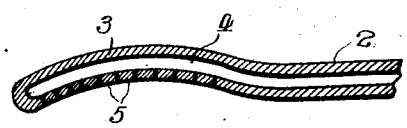

Figs. 3 and 4 are cross sections taken on lines 3—3 and 4—4 in Fig. 2.

The device shown preferably comprises a member 1 having more or less the shape of a tooth brush without the bristles; that is to say it has a shank or handle part 2 and a back 3 adapted for insertion into the mouth. Said member 1 is preferably made of some rubber composition, such as vulcanite or the like, although it can of course be made of different materials.

The member 1 is made with a longitudinally extending duct or passage 4 opening at the end of the shank 2 and extending into and along nearly to the end of the part 3. In the part 3 there are holes 5—5 opening inwardly or downwardly, there being a series of holes 5—5 preferably extending along the length of the part 3 substantially from end to end of the same.

A tubular member 6 preferably in the form of a rubber hose is secured to the end of the shank 2 and connected therewith so as to afford connection between the interior of the member 6 and the passage 4 of the member 1.

The member 6 is intended to be connected with a water faucet, either cold or hot, but preferably one which is supplied with both cold and hot water, so that the stream of water can be regulated to any desired temperature.

The member 1 is then taken in the hand and inserted into the mouth and used as a tooth brush, either with or without a dental preparation. The water will emerge from the apertures 5—5 and will shoot or spray against the teeth. This will thoroughly wash and cleanse the teeth and mouth, continuously supplying a stream of water in the form of a plurality of sprays which will be much more effective than a tooth brush with bristles.

It will be understood that changes and modifications may be made without departing from the spirit of the invention.

What I claim is:

A device of the class specified, comprising a member of tooth brush shape having a handle or shank portion, and also having a curved portion the concave face of which is provided with inwardly opening apertures adapted to form a spray, said member being provided with a longitudinally extending passage communicating with said apertures and opening at the end of said shank portion, and a flexible hose connected with the end of said shank portion and communicating with said longitudinally extending passage.

In witness whereof, I hereunto subscribe my name this 7th day of February, A. D., 1921.

JAMES H. ROSS, JR.